(12) United States Patent
Shvachko et al.

(10) Patent No.: US 9,424,272 B2
(45) Date of Patent: *Aug. 23, 2016

(54) DISTRIBUTED FILE SYSTEM USING CONSENSUS NODES

(71) Applicant: WANdisco, Inc., San Ramon, CA (US)

(72) Inventors: Konstantin V Shvachko, Fremont, CA (US); Jagane Sundar, Saratoga, CA (US); Michael Parkin, Sheffield (GB); Yeturu Aahlad, Foster City, CA (US)

(73) Assignee: WANdisco, Inc., San Ramon, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/041,894

(22) Filed: Sep. 30, 2013

(65) Prior Publication Data

US 2015/0067004 A1 Mar. 5, 2015

Related U.S. Application Data

(62) Division of application No. 14/013,948, filed on Aug. 29, 2013, now Pat. No. 9,361,311.

(51) Int. Cl.
*G06F 17/30* (2006.01)

(52) U.S. Cl.
CPC .... *G06F 17/30194* (2013.01); *G06F 17/30123* (2013.01); *G06F 17/30598* (2013.01)

(58) Field of Classification Search
CPC ............... G06F 17/30598; G06F 17/30705; G06F 17/30215
See application file for complete search history.

(56) References Cited

U.S. PATENT DOCUMENTS

| | | |
|---|---|---|
| 5,261,085 A | 11/1993 | Lamport |
| 5,699,515 A | 12/1997 | Berkema et al. |
| 5,737,601 A | 4/1998 | Jain et al. |
| 5,781,910 A | 7/1998 | Gostanian et al. |
| 5,963,086 A | 10/1999 | Hall |
| 6,014,669 A | 1/2000 | Slaughter et al. |

(Continued)

FOREIGN PATENT DOCUMENTS

| | | |
|---|---|---|
| CN | 102999633 A | 3/2013 |
| CN | 103458044 A | 12/2013 |
| WO | 2012068184 A1 | 5/2014 |

OTHER PUBLICATIONS

Notice of Allowance dated Jan. 29, 2015 in related U.S. Appl. No. 13/838,639.

(Continued)

*Primary Examiner* — Cam-Y Truong
(74) *Attorney, Agent, or Firm* — Young Law Firm, P.C.

(57) ABSTRACT

A cluster of nodes in a distributed file system may include; at least two namenodes, each coupled to a plurality of data nodes and each configured to store a state of a namespace of the cluster and each being configured to respond to a request from a client while other(s) of the namenodes are responding to other requests from other clients; and a coordination engine coupled to each of the namenodes. The coordination engine may be configured to receive proposals from the namenodes to change the state of the namespace by replicating, deleting and/or adding data blocks stored in the data nodes and to generate, in response, an ordered set of agreements that specifies an order in which the namenodes are to change the state of the namespace. The namenodes are configured to delay making changes thereto until after the ordered set of agreements is received from the coordination engine.

20 Claims, 4 Drawing Sheets

(56) References Cited

U.S. PATENT DOCUMENTS

| | | | |
|---|---|---|---|
| 6,161,146 | A | 12/2000 | Kley et al. |
| 6,202,067 | B1 | 3/2001 | Blood et al. |
| 6,261,085 | B1 | 7/2001 | Steger et al. |
| 6,360,366 | B1 | 3/2002 | Heath et al. |
| 6,401,120 | B1 | 6/2002 | Gamache et al. |
| 6,763,013 | B2 | 7/2004 | Kennedy |
| 6,763,014 | B2 | 7/2004 | Kennedy |
| 6,898,642 | B2 | 5/2005 | Chafle et al. |
| 6,973,053 | B1 | 12/2005 | Passman |
| 7,155,524 | B1 | 12/2006 | Reiter et al. |
| 7,167,900 | B2 | 1/2007 | Berkowitz et al. |
| 7,185,076 | B1 | 2/2007 | Novaes |
| 7,187,226 | B2 | 3/2007 | Audy |
| 7,272,129 | B2 | 9/2007 | Calcev |
| 7,280,040 | B2 | 10/2007 | DeVaul |
| 7,334,154 | B2 | 2/2008 | Lorch et al. |
| 7,400,596 | B1 | 7/2008 | Robertson |
| 7,558,883 | B1 | 7/2009 | Lamport |
| 7,729,336 | B2 | 6/2010 | Pun |
| 7,765,186 | B1 | 7/2010 | Hu |
| 7,788,522 | B1 | 8/2010 | Abdelaziz |
| 7,849,223 | B2 | 12/2010 | Malkhi |
| 8,194,422 | B2 | 6/2012 | Djenguerian |
| 8,458,239 | B2* | 6/2013 | Ananthanarayanan et al. ............ 707/828 |
| 8,489,549 | B2* | 7/2013 | Guarraci ............ 707/612 |
| 8,537,721 | B2 | 9/2013 | Patel |
| 8,693,453 | B2 | 4/2014 | Priyantha |
| 8,732,648 | B2 | 5/2014 | Suaya |
| 8,818,951 | B1* | 8/2014 | Muntz ............ G06F 17/30 707/639 |
| 9,009,215 | B2 | 4/2015 | Aahlad |
| 9,020,987 | B1 | 4/2015 | Nanda |
| 2002/0129087 | A1 | 9/2002 | Cachin et al. |
| 2002/0184169 | A1 | 12/2002 | Opitz |
| 2003/0145020 | A1 | 7/2003 | Ngo et al. |
| 2004/0034822 | A1 | 2/2004 | Marchand |
| 2004/0042417 | A1 | 3/2004 | Kennedy |
| 2004/0172421 | A1* | 9/2004 | Saito et al. ............ 707/200 |
| 2004/0221149 | A1 | 11/2004 | Rao et al. |
| 2004/0254984 | A1 | 12/2004 | Dinker |
| 2005/0086384 | A1* | 4/2005 | Ernst ............ 709/248 |
| 2005/0198493 | A1 | 9/2005 | Bartas |
| 2005/0283644 | A1 | 12/2005 | Lorch et al. |
| 2006/0045055 | A1 | 3/2006 | Ramadas |
| 2006/0143517 | A1 | 6/2006 | Douceur et al. |
| 2006/0155729 | A1 | 7/2006 | Aahlad et al. |
| 2006/0203837 | A1 | 9/2006 | Shvodian |
| 2006/0235889 | A1 | 10/2006 | Rousseau et al. |
| 2006/0259818 | A1 | 11/2006 | Howell et al. |
| 2006/0265508 | A1 | 11/2006 | Angel |
| 2007/0168412 | A1 | 7/2007 | DeVaul |
| 2007/0189249 | A1 | 8/2007 | Gurevich et al. |
| 2007/0226160 | A1 | 9/2007 | Acharya |
| 2008/0036472 | A1 | 2/2008 | Collins et al. |
| 2008/0133741 | A1 | 6/2008 | Kubota |
| 2009/0150566 | A1 | 6/2009 | Malkhi et al. |
| 2009/0210431 | A1 | 8/2009 | Marinkovic |
| 2010/0118842 | A1 | 5/2010 | Kalhan |
| 2010/0153282 | A1 | 6/2010 | Graham |
| 2010/0180146 | A1 | 7/2010 | Rousseau et al. |
| 2010/0188969 | A1 | 7/2010 | Kim |
| 2010/0192160 | A1 | 7/2010 | Taylor et al. |
| 2010/0333166 | A1 | 12/2010 | Herrod |
| 2010/0333168 | A1 | 12/2010 | Herrod |
| 2011/0066296 | A1 | 3/2011 | Nelson |
| 2011/0107358 | A1* | 5/2011 | Shyam et al. ............ 719/330 |
| 2011/0302449 | A1 | 12/2011 | Douceur et al. |
| 2012/0101991 | A1 | 4/2012 | Srivas et al. |
| 2012/0130950 | A1* | 5/2012 | Jain et al. ............ 707/634 |
| 2012/0197958 | A1* | 8/2012 | Nightingale ............ G06F 9/5027 709/201 |
| 2012/0204139 | A1 | 8/2012 | Suaya et al. |
| 2012/0254412 | A1 | 10/2012 | Goose et al. |
| 2013/0111261 | A1 | 5/2013 | Dalton |
| 2014/0059310 | A1 | 2/2014 | Du et al. |
| 2014/0074996 | A1 | 3/2014 | Bortnikov et al. |
| 2014/0081927 | A1 | 3/2014 | Lipcon |
| 2014/0164262 | A1 | 6/2014 | Graham |
| 2014/0181262 | A1 | 6/2014 | Goswami et al. |
| 2014/0195558 | A1* | 7/2014 | Murthy et al. ............ 707/770 |
| 2014/0330787 | A1* | 11/2014 | Modukuri et al. ............ 707/659 |
| 2014/0358844 | A1 | 12/2014 | Mundlapudi |
| 2015/0120791 | A1 | 4/2015 | Gummaraju |
| 2015/0234845 | A1 | 8/2015 | Moore |

OTHER PUBLICATIONS

International Search Report and Written Opinion of Dec. 5, 2014 in related application PCT/US2014/053404.
International Search Report and Written Opinion in PCT/US14/10451, dated Aug. 5, 2014.
International Search Report and Written Opinion in PCT/US13/63454, dated Apr. 18, 2014.
USPTO Office Action of Feb. 5, 2015 in related U.S. Appl. No. 13/835,888.
USPTO Notice of Allowance of Jan. 29, 2015 in related U.S. Appl. No. 13/838,639.
Wiki Amazon S3, downloaded: from http://en.wikipedia.org/wiki/Amazon_S3 on Mar. 4, 2014.
Introducing Geo-replication for Windows Azure Storage, Sep. 15, 2011 1:27 PM, downloaded from http://blogs.msdn.com/b/windowsazurestorage/archive/2011/09/15/introducing-geo-replication-for-windows-azure-storage.aspx on Mar. 4, 2014.
Google Cloud Storage Overview, downloaded from https://developers.google.com/storage/docs/overview on Mar. 4, 2014.
Cloudera Backup and Disaster Recovery, downloaded from https://www.cloudera.com/content/cloudera-content/cloudera-docs/CM4Ent/latest/Cloudera-Backup-Disaster-Recovery/Cloudera-Backup-Data-Recovery.html on Mar. 4, 2014.
What is Hadoop? • Apache Falcon Apache Falcon a framework for managing data processing in Hadoop Clusters, downloaded from http://hortonworks.com/hadoop/falcon/ on Mar. 4, 2014.
MapR Disaster Recovery Scenario Data+Protection, Peter Conrad, last edited by Anne Leeper on Feb. 22, 2014, downloaded from http://doc.mapr.com/display/MapR/Data+Protection#DataProtection-Disaster-RecoveryScenario:DisasterRecovery on Mar. 4, 2014.
Hadoop HDFS HDFS-5442 Zero loss HDFS data replication for multiple datacenters, The Apache Software Foundation , Created: Oct. 29, 2013 13:11 Updated: Jan. 10, 2014 08:13, doownloaded from https://issues.apache.org/jira/browse/HDFS-5442 on Mar. 4, 2014.
Disaster Recovery Solution for Apache Hadoop Contributors: Chen Haifeng (haifeng.chen@intel.com), Gangumalla Uma (uma.gangumalla@intel.com), Dey Avik (avik.dey@intel.com), Li Tianyou (tianyou.li@intel.com), Purtell, Andrew (andrew.k.purtell@intel.com), donwloaded from https://issues.apache.org/jira/secure/attachment/12620116/Disaster%20Recovery%20Solution%20for%20Hadoop.pdf on Mar. 4, 2014.
Spanner. Google's Globally-Distributed Database, James C. Corbett, Jeffrey Dean, Michael Epstein, Andrew Fikes, Christopher Frost, JJ Furman, Sanjay Ghemawat, Andrey Gubarev, Christopher Heiser, Peter Hochschild, Wilson Hsieh, Sebastian Kanthak, Eugene Kogan, Hongyi Li, Alexander Lloyd, Serdey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford, downloaded from http://research.google.com/archive/spanner.html on Mar. 4, 2014.
Transactional storage for geo-replicated systems Yair Sovran, Russell Power, Marcos K. Aguilera, Jinyang Li, downloaded from http://research.microsoft.com/en-us/people/aguilera/walter-sosp2011.pdf on Mar. 4, 2014.
Stronger Semantics for Low-Latency Geo-Replicated Storage, Wyatt Lloyd, Michael J. Freedman, Michael Kaminsky, and David G. Andersen, To appear in Proceedings of the 10th USENIX Symposium on Networked Systems Design and Implementation (NSDI'13),

(56) References Cited

OTHER PUBLICATIONS

Lombard, IL, Apr. 2013, downloaded from http://sns.cs.princeton.edu/docs/eiger-nsdi13.pdf on Mar. 4, 2014.
CSPAN: Cost-Effective Geo-Replicated Storage Spanning Multiple Cloud Services, Zhe Wu, Michael Butkiewicz, Dorian Perkins, Ethan Katz-Bassett, Harsha V. Madhyastha, downloaded from http://conferences.sigcomm.org/sigcomm/2013/papers/sigcomm/p545.pdf on Mar. 4, 2014.
USPTO Office Action of Dec. 19, 2014 in related U.S. Appl. No. 13/337,366.
International Search Report and Written Opinion in PCT/US13/63422, dated Apr. 21, 2014.
Geo-replication, downloaded from http://searchwindowsserver.techtarget.com/definition/geo-replication on Mar. 4, 2014.
Amazon Simple Storage Service Developer Guide API Verson Mar. 1, 2006 downloaded from http://awsdoc.s3.amazonaws.com/S3/latest/s3-dg.pdf on Mar. 4, 2014.
International Preliminary Report on Patentability of Jul. 9, 2015 in PCT application PCT/US2013/063422.
International Preliminary Report on Patentability of Jul. 9, 2015 in PCT application PCT/US2013/063454.
International Search Report and Written Opinion of Jun. 25, 2015 in PCT application PCT/US2015/18680.
Office Action of Jun. 24, 2015 in U.S. Appl. No. 13/837,366.
Office Action of Jun. 25, 2015 in U.S. Appl. No. 12/069,968.
USPTO Notice of Allowance dated Mar. 8, 2016 in U.S. Appl. No. 13/837,366.
USPTO Office Action of Feb. 3, 2016 in U.S. Appl. No. 14/231,311.
USPTO Notice of Allowance dated Jul. 30, 2015 in U.S. Appl. No. 14/464,030.
USPTO Office Action dated Sep. 24, 2015 in U.S. Appl. No. 14/013,948.
Implementing Fault-Tolerant Services Using the State Machine Approach: A Tutorial, Fred B. Schneider Department of Computer Science University, Ithaca, New York 14853, ACM Computing Surveys, vol. 22, No. 4, Dec. 1990.
Specifying Systems, The TLA+ Language and Tools for Hardware and Software Engineers Leslie Lamport, Microsoft Research, First Printing, Version of Jun. 18, 2002, ISBN 0-321-14306-X.
The Part-Time Parliament, Leslie Lamport, ACM Transacfions on Computer Systems 16, May 2, 1998, 133-169.
Time, Clocks, and the Ordering, of Events in a Distributed System, Leslie Lamport, Massachusetts Computer Associates, Inc., Communications of the ACM, Jul. 1978, vol. 21, No. 7.
Implementing Fault-Toterant Services Using the State Machine Approach: A Tutorial, Fred B. Schneider Department of Computer Science, Cornell University, Ithaca, New York 14853, ACM Computing Surveys, vol. 22, No. 4, Dec. 1990.
Paxos Made Simple, Leslie Lamport, Nov. 1, 2001.
Oki et al. "Viewstamped Replication: A new Primary Copy Method to Support Highly-Available Distributed Systems", Technical Paper submitted at ACM Symposium . . . , 1998, pp. 8-17.
Bernstein et al., "Concurrency Control & Recovery in Database Systems", pubiished by Addison Wesley, 1987, Chapters 6, 7 and 8.
Eli Coffins; Todd Lipcon, Aaron T Myers, HDFS High Availability, Oct. 8, 2013.
Sanjay Radia, Rob Chansler, Suresh Srinivas, High Availabiiity Framework for the HDFS Namenode, Oct. 8, 2013.
Sanjay Radia, Suresh Srinivas, Yahoo! Inc. High Availability for the HDFS Namenode, Oct. 8, 2013.
Todd Lipcon, Quorum-Journal Design, Oct. 3, 2012.
USPTO Office Action of May 22, 2015 in related U.S. Appl. No. 14/013,948.
USPTO Office Action of Jul. 6, 2016 in U.S. Appl. No. 15/004,144.

* cited by examiner

DISTRIBUTED FILE SYSTEM USING CONSENSUS NODES

CROSS-REFERENCE TO RELATED CASES

The present application is a divisional of commonly owned and co-pending U.S. patent application Ser. No. 14/013,948 filed on Aug. 29, 2013. The present application is also related in subject matter to commonly assigned and co-pending U.S. patent application Ser. No. 12/069,986 filed on Feb. 13, 2008, which is a divisional of U.S. patent application Ser. No. 11/329,996 filed on Jan. 11, 2006, now U.S. Pat. No. 8,364,633, which patent claims the benefit of U.S. provisional patent application 60/643,257 filed Jan. 12, 2005. U.S. provisional application 60/643,258 filed Jan. 12, 2005 and of U.S. provisional patent application 60/643,269 filed Jan. 12, 2005. This application is also related in subject matter to commonly assigned and co-pending U.S. patent application Ser. No. 12/835,888 filed on Mar. 15, 2013 that claims then benefit of U.S. provisional application 61/746,867 filed on Dec. 28, 2012 and is also related in subject matter to commonly assigned and co-pending U.S. patent application Ser. No. 13/837,366 filed on Mar. 15, 2013 that claims the benefit of U.S. provisional application 61/746,940 filed on Dec. 28, 2012. The disclosure of each of these is hereby incorporated by reference in its entirety.

BACKGROUND

The Hadoop Distributed File System (HDFS) namespace is a hierarchy of files and directories. Files and directories are represented on the NameNode by Inodes. Inodes record attributes like permissions, modification and access times, namespace and disk space quotas. The file content is split into large data blocks (typically 128 MB), and each data block of the file is independently replicated at multiple DataNodes (typically three). The NameNode is the metadata service of HDFS, which is responsible for namespace operations. The NameNode maintains the namespace tree and the mapping of blocks to DataNodes. That is, the NameNode tracks the location of data within a Hadoop cluster and coordinates client access thereto. Conventionally, each cluster has a single NameNode. The cluster can have thousands of DataNodes and tens of thousands of HDFS clients per cluster, as each DataNode may execute multiple application tasks concurrently. The Inodes and the list of data blocks that define the metadata of the name system are called the image. NameNode keeps the entire namespace image in RAM. The persistent record of the image is stored in the NameNode's local native filesystem as a checkpoint plus a journal representing updates to the namespace carried out since the checkpoint was made.

A distributed system is composed of different components called nodes. To maintain system consistency, it may become necessary to coordinate various distributed events between the nodes. The simplest way to coordinate a particular event that must be learned consistently by all nodes is to choose a designated single master and record that event on the master so that other nodes may learn of the event from the master. Although simple, this approach lacks reliability, as failure of the single master stalls the progress of the entire system. In recognition of this, and as shown in FIG. 1, conventional HDFS implementations use an Active NameNode 102 that is accessed during normal operations and a backup called the Standby NameNode 104 that is used as a failover in case of failure of the Active NameNode 102.

As shown in FIG. 1, a conventional HDFS cluster operates as follows. When an update to the namespace is requested, such when an HDFS client issues a remote procedure call (RPC) to, for example, create a file or a directory, the Active NameNode 102, as shown in FIG. 1:
  1. receives the request (e.g., RPC) from a client;
  2. immediately applies the update to its memory state;
  3. writes the update as a journal transaction in shared persistent storage 106 (such as a Network Attached Storage (NAS) comprising one or more hard drives) and returns to the client a notification of success.

The Standby NameNode 104 must now update its own state to maintain coherency with the Active NameNode 102. Toward that end, the Standby NameNode 104
  4. reads the journal transaction from the transaction journal 106, and
  5. updates its own state This, however, is believed to be a sub-optimal solution. For example, in this scheme, the Transaction Journal 106 itself becomes the single point of failure. Indeed, upon corruption of the transaction journal 106, the Standby NameNode 104 can no longer assume the same state as the Active NameNode 102 and failover from the active to the Standby NameNode is no longer possible.

Moreover, in Hadoop solutions that support only one active NameNode per cluster, standby servers, as noted above, are typically kept in sync via Network Attached Storage (NAS) devices. If the active NameNode fails and the standby has to take over, there is a possibility of data loss if a change written to the Active NameNode has yet to be written to the NAS. Administrator error during failover can lead to further data loss. Moreover, if a network failure occurs in which the active server cannot communicate with the standby server but can communicate with the other machines in the cluster, and the standby server mistakenly assumes that the active server is dead and takes over the active role, then a pathological network condition known as a "split-brain" can occur, in which two nodes believe that they are the Active NameNode, which condition can lead to data corruption.

DETAILED DESCRIPTION

Figure 1:
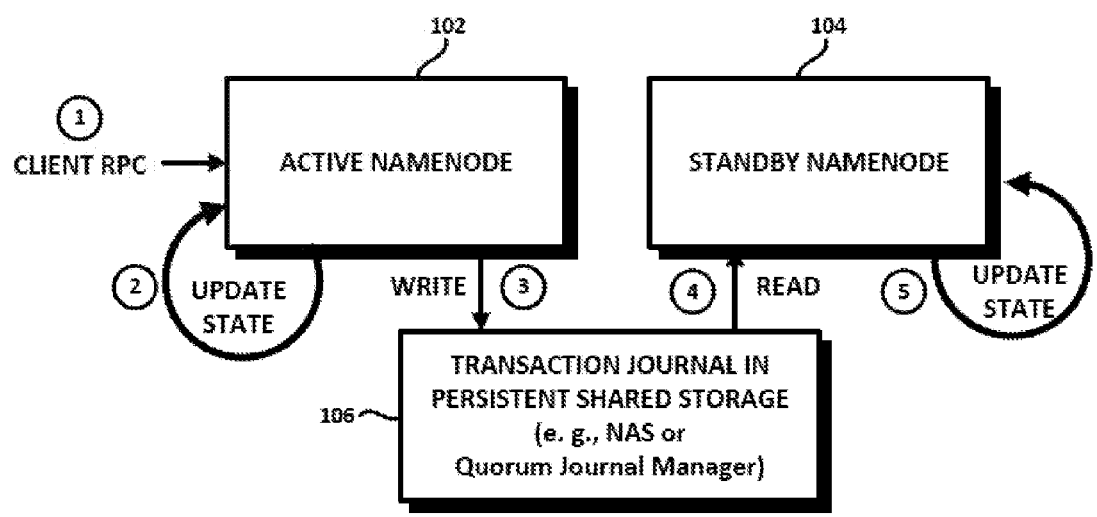
FIG. 1 is a diagram of a conventional HDFS implementation.

The roles of proposers (processes who make proposals to the membership), acceptors (processes who vote on whether a proposal should be agreed by the membership) and learners (processes in the membership who learn of agreements that have been made) are defined in, for example, the implementation of the Paxos algorithm described in Lamport, L.: The Part-Time Parliament. ACM Transactions on Computer Systems 16, 2 (May 1998), 133-169, which is incorporated herein in its entirety. According to one embodiment, multiple nodes, called acceptors, may be configured to store events. The events may be submitted as proposals to a quorum of acceptors. Using an internal protocol, the acceptors may then agree on the order of the event in a global sequence of events. Once the agreement is reached, the acceptors let the learners learn the events in the order consistent for all learners in the system. Thus, a Coordination Engine (such as shown at 208 in FIG. 2) may comprise is a set of acceptors along with a protocol, which allows acceptors to agree on the order of events submitted to the engine by multiple proposers. In order to achieve reliability, availability, and scalability, multiple simultaneously active NameNodes, according to one embodiment, may be provided by replicating the state of the namespace on multiple nodes with the requirement that the state of the nodes on which the namespace is replicated remains consistent between such nodes.

This consistency between NameNodes may be guaranteed by the Coordination Engine, which may be configured to accept proposals to update the namespace, streamline the proposals into a global sequence of updates and only then allow the NameNodes to learn and apply the updates to their individual states in the agreed-upon order. Herein, "consistency" means One-Copy Equivalence, as detailed in Bernstein et al., "Concurrency Control & Recovery in Database Systems", published by Addison Wesley, 1987, Chapters 6, 7 & 8, which is hereby incorporated herein in its entirety. Since the NameNodes start from the same state and apply the same deterministic updates in the same deterministic order, their respective states are and remain consistent.

According to one embodiment, therefore, the namespace may be replicated on multiple NameNodes, provided that
  a) each node is allowed to modify its namespace replica, and
  b) updates to one namespace replica must be propagated to the namespace replicas on other nodes such that the namespace replicas remain consistent with one another, across nodes.

One embodiment, therefore, eliminates the most problematic single point of failure impacting availability—the single NameNode. Conventionally, if the single NameNode becomes unavailable, the Hadoop cluster is down and complex failover procedures (such as switching from a previously Active NameNode to a Standby NameNode) are required to restore access. To address this potential single point of failure, one embodiment enables multiple active NameNode servers (herein variously denoted as ConsensusNode or CNodes) to act as peers, each continuously synchronized and simultaneously providing client access, including access for batch applications using MapReduce and real-time applications using HBase. According to one embodiment, when a NameNode server fails or is taken offline for maintenance or any other reason by a user, other peer active NameNode servers are always available, meaning there is no interruption in read and write access to the HDFS metadata. As soon as this server comes back online, its NameNode recovers automatically, is apprised of any new changes to the namespace that may have occurred in the interim and synchronizes its namespace to match the namespace of all of other NameNodes on the cluster. It will be consistent with the other replicas as it learns of the changes in the same deterministic order as the other nodes learnt of the changes.

Figure 2:
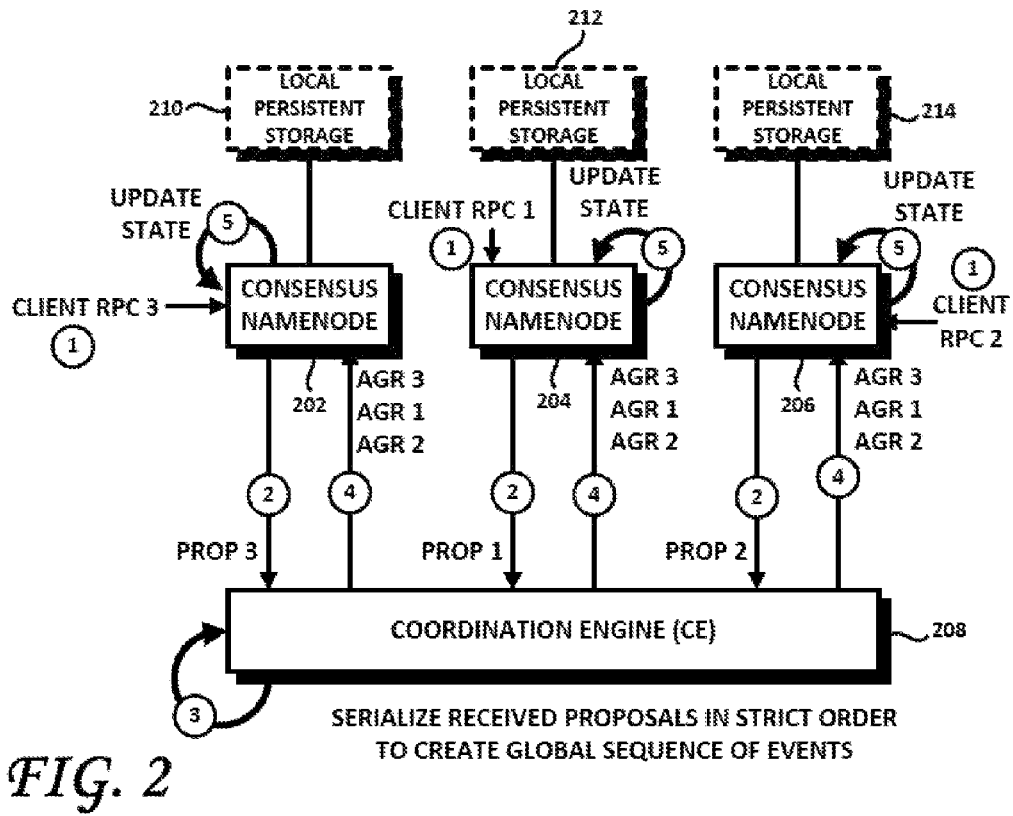
FIG. 2 is a diagram of a distributed file system and aspects of updating Consensus NameNodes according to one embodiment.
Figure 4:
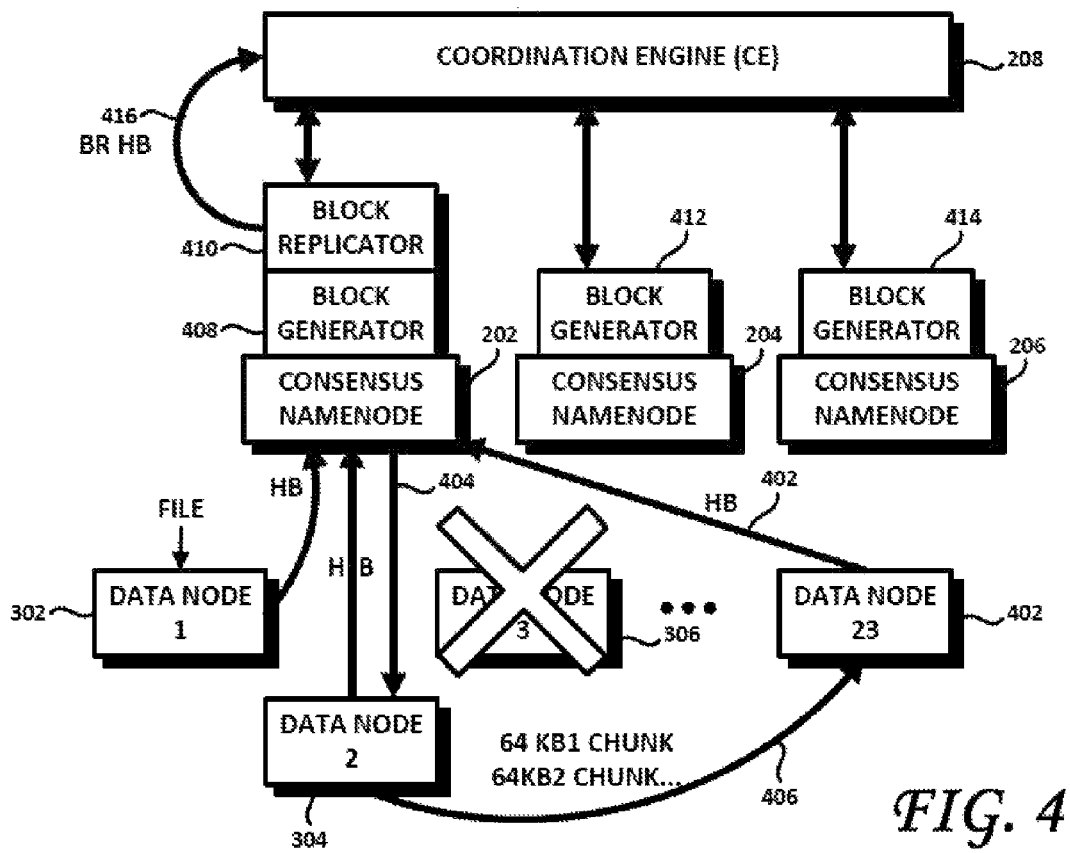
FIG. 4 is a diagram illustrating further aspects of block replication, according to one embodiment.

FIG. 2 is a diagram of a distributed file system and aspects of updating ConsensusNode according to one embodiment. According to one embodiment, rather than a single Active NameNode and a Standby NameNode, a cluster may comprise a (preferably odd) plurality (e.g., 3, 5, 7 . . . ) of NameNodes that are coordinated by a Coordination Engine 208. As noted above, herein, a coordinated NameNode is called a ConsensusNode or, hereafter, CNode. As shown in FIG. 2, one embodiment may comprise three CNodes 202, 204, 206, each coupled to the Coordination Engine 208. According to one embodiment, the coordination engine 208 may be configured as an agent at each node, with the agents coordinating with each other over a network. However, for ease of reference and depiction, the Coordination Engine 208 is shown in FIGS. 2 and 4 as being a separate, single entity. According to one embodiment, updates to the namespace, initiated on one instance of the NameNode 202, 204 or 206, are propagated to the other instances in a consistent way by means of the Coordination Engine 208. In this manner, clients access a consistent namespace across all instances of the NameNode. The replication methods disclosed herein provide an active-active model of high availability for a distributed file system such as HDFS, in which metadata requests (read or write) may be load-balanced between multiple instances of the NameNode.

The Coordination Engine 208 may be configured to determine the global order of updates to the namespace. As all instances of the namespace begin in the same state and as all nodes are caused to apply updates in the same deterministic order (but not necessarily, according to embodiments, at the same time), the state of the multiple instances of the namespace will remain consistent (or be brought into consistency) across nodes.

According to one embodiment, and as shown in FIG. 2, consistent updates to the multiple CNode replicas 202, 204, 206 may be carried out as follows. As shown at (1), one of the CNodes (in this case, CNode 202) receives a request to update the namespace from a client. Such a namespace update may comprise a RPC, identified in FIG. 2 as RPC 3. Similarly, in this example, CNode 204 receives RPC 1 and CNode 206 receives RPC 2. The RPCs may comprise a request to add data blocks to a file, create a file or create a directory, for example. According to one embodiment, rather than CNode 202 immediately updating its state with the event (e.g., read, write, delete, etc.) encapsulated within RPC 3, CNode 204 immediately updating its state with the event encapsulated within received RPC 1 and CNode 206 immediately updating its state with the event encapsulated within received RPC 2, and then propagating the updated namespaces to the other ones of the CNodes 202, 204, 206, these separate updates to the namespace replicas at the CNodes are instead passed as proposals to the Coordination Engine 208, which then issues corresponding agreements to the CNodes 202, 204, 206. Indeed, according to one embodiment, the mechanism by which the namespace replicas stored by the CNodes 202, 204, 206 are kept consistent is by issuing proposals to and receiving agreements from the Coordination Engine 208. That is, as shown in FIG. 2, responsive to the receipt of RPC 3, CNode 202 may issue a proposal Prop3 to the Coordination Engine 208 as shown at (2). Similarly, responsive to the receipt of RPC 1, CNode 204 may issue a proposal Prop to the Coordination Engine 208 as shown at (2) and responsive to the receipt of RPC 2, CNode 206 may issue a proposal Prop2 to the Coordination Engine 208 as also shown at (2). The Coordination Engine 208, according to one embodiment, then orders the proposals it receives as shown at (3) and feeds the ordered agreements (in this case, ordered as AGR3, AGR1 and AGR2) back to CNodes 202, 204, 206, as shown at (4). The CNodes 202, 204 and 206, upon receipt of the ordered sequence of agreements AGR3, AGR1 and AGR2, apply these agreements to their respective memory states in that deterministic order, so that the namespace replicas may be maintained consistent across CNodes 202, 204, 206. In this manner, the state of the CNodes 202, 204, 206 may be asynchronously updated, as shown at (5) without loss of consistency. These updates may then (but need not) be saved as journal transactions in respective local persistent storage 210, 212, 214 that may (but need not, as indicated by the dashed lines at 210, 212 and 214) be coupled or accessible to the CNodes 202, 204, 206. Then, notifications may be returned to the clients of CNode 202, 204, 206, informing the clients of the success of the update.

Thus, according to one embodiment, CNodes 202, 204, 206 do not directly apply client requests to their respective states, but rather redirect them as proposals to the Coordination Engine 208 for ordering. Updates to the CNodes are then issued from the Coordination Engine 208 as an ordered set of agreements. This guarantees that every CNode 202, 204, 206 is updated when the client requests changes from one of them, and that the updates will be transparently and consistently applied to all CNodes in the cluster.

For example, if a client creates a directory via CNode 202, and then tries to list the just-created directory via CNode 204, CNode 204 may return a "file not found" exception. Similarly, a client may read different number of bytes of the last data block of a file that is under construction because replicas of the same block on different DataNodes have different lengths while the data is in transition from one DataNode to another, as detailed below relative to FIG. 3. This is known as a "stale read" problem.

Therefore, a significant role of the Coordination Engine 208, according to one embodiment, is to process the namespace state modification proposals from all CNodes and transform them into the global ordered sequence of agreements. The CNodes may then apply the agreements from that ordered sequence as updates to their state. The agreements may, according to one embodiment, be ordered according to a Global Sequence Number (GSN), which may be configured as a unique monotonically increasing number. The GSN may be otherwise configured, as those of skill in this art may recognize. The GSN may then be used to compare the progress of different CNodes in updating the state of the namespace and keeping that namespace state consistent across CNodes. For example, if CNode 202 has just processed an agreement numbered GSN1, which is smaller than GSN2 just processed by CNode 204, then CNode 202 has an earlier namespace state than CNode 204.

According to one embodiment, with each operation, clients learn about the latest GSN processed on the CNode to which the client is currently connected. Thereafter, if the client switches to another CNode it should, according to one embodiment, first wait (if necessary) until the new CNode catches up with the last GSN the client knows about (i.e., the GSN that the client received from the previously-accessed CNode) before issuing an RPC comprising a data access command. This will avoid the stale read problem.

According to one embodiment, only the operations that update the state of the namespace need to be coordinated by the Coordination Engine 208. That is, most (but not all, according to one embodiment detailed below) read requests may be directly served by any of the CNodes to which the client is connected, as read requests do not alter the state of the namespace. It is to be noted that, according to one embodiment, the Coordination Engine 208 does not guarantee that all CNodes 202, 204, 206 have the same state at any given moment. Rather, the Coordination Engine 208 guarantees that every CNode 202, 204, 206 will eventually learn about every update in the same order as all other CNodes, and clients will be able to see this information. In this manner, the Coordination Engine 208 is configured to generate a globally ordered sequence of events that is identically supplied to all CNodes 202, 204, 206.

According to one embodiment, journal updates to the local persistent storage 210, 212, 214 may be carried out. However, the consistency of the CNodes 202, 204, 206 do not depend on such journal updates and each of the persistent storages (if present), according to one embodiment, is local to a CNode and is not shared across CNodes. Similarly, maintaining the consistency of the namespace state across CNodes 202, 204, 206 does not rely upon sharing other resources, such as memory or processor resources.

There is no preferred (master or otherwise distinguished) CNode, according to embodiments. Indeed, should one or more CNode server fail, or is taken offline for maintenance (or for any other reason), other active CNode servers are always available to serve clients without any interruption in access. According to one embodiment, as soon as the server comes back online, it resynchronizes with the other CNode servers automatically, as described below. Such synchronization may comprise learning of all agreements that were issued by the Coordination Engine 208 since the CNode went down or was taken offline. Both the split-brain condition and data loss are eliminated, as all CNodes are active and always maintained in or brought to synchronism, thereby providing continuous hot backup by default. Both failover and recovery are immediate and automatic, which further eliminates need for manual intervention and the risk of administrator error. Moreover, none of the CNodes 202, 204, 206 is configured as passive standby NameNodes. Indeed, according to one embodiment all CNode servers in the cluster are configured to support simultaneous client requests. Consequently, this enables the cluster to be scaled to support additional CNode servers, without sacrificing performance as workload increases. According to one embodiment, there are no passive standby servers and the vulnerabilities and bottleneck of a single active NameNode server are completely eliminated. Moreover, distributing client requests across multiple CNodes 202, 204, 206 inherently distributes the processing load and traffic over all available CNodes. Active load balancing across CNodes 202, 204, 206 may also be carried out, as compared to the Active/Standby NameNode paradigm, in which all client requests are serviced by a single NameNode.

Figure 3:
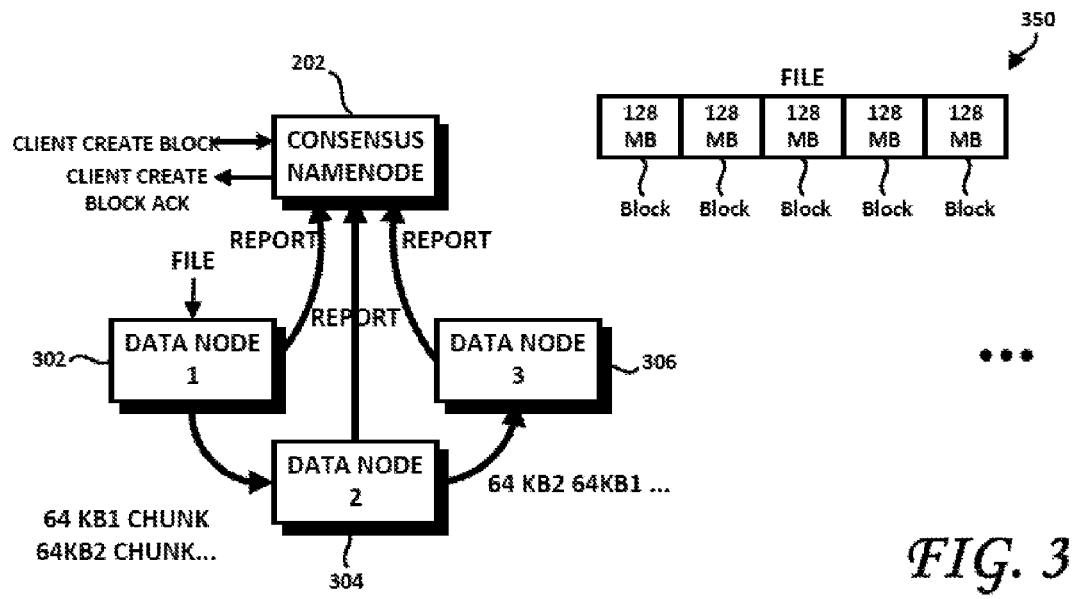
FIG. 3 is a diagram illustrating aspects of a method of block replication and generation in a distributed file system, according to one embodiment.

FIG. 3 is a diagram illustrating aspects of a method of block replication and generation in a distributed file system, according to one embodiment. At 350, FIG. 3 shows a file to be stored in HDFS. According to one embodiment, the unit of storage may be termed a block and the block size may be quite large. For example, the block size may be 128 MB of physical storage. Other block sizes may be readily implemented. File 350 is shown in FIG. 3 as comprising a plurality of 128 MB data blocks. The block size need not be 128 MB. According to one embodiment, each data block of a file may be replicated (i.e., identically stored) on a plurality of DataNodes. Such DataNodes are shown at 302, 304 and 306 and are configured to couple to one or more CNodes, such as CNode 202. According to one embodiment, each DataNode may be configured to communicate with each of the CNodes on the cluster. Data blocks of files may be stored on a greater number of DataNodes, such as on 5 or 7 DataNodes. Storing each data block on multiple DataNodes provides data reliability through redundancy.

As shown in FIG. 2, a client sends a message (e.g., a RPC) to CNode 202, indicating the client's intention to create a file and write a block of data to the file. The CNode 202, according to one embodiment, may then select multiple DataNodes (three in this exemplary implementation) 302, 304 and 306, to which the data block of this newly-created file will be replicated, and so informs the client. The client may then, according to one embodiment, begin streaming (or otherwise sending) data to a selected one of the three DataNodes 302, 304 and 306. Such streaming may be carried out by serially sending to the selected DataNode (DataNode 302, for example) small chunks of each data block. For example, the client may send to the DataNode 302 a serial stream of 64 KB chunks of the first data block of the file, until the first data block of the file has been successfully transmitted to the DataNode 302. Handshaking between the client and the selected DataNode 302 may ensure that each data block is successfully received and stored by the selected DataNode 302. The data chunks sent to the first DataNode 302 may also comprise an indication of the second DataNode 304 to which the data blocks of the client's file are to be sent. According to one embodiment, rather than the client sending the data blocks of the file directly to the three (or more) DataNodes selected by the CNode 202 to receive replicas of the data blocks of the file, the first DataNode 302, having just received a chunk of data of the block, may then itself send the received data chunk to the next (e.g., DataNode 304) of the three DataNodes to receive the data blocks of the file. Similarly, after DataNode 304 has successfully received the data chunk sent to it by DataNode 302, it may then send the data chunk to the last of the three DataNodes selected by the CNode 202 to receive replicas of the constituent data blocks of the client's file. In this manner, a pipeline of data chunks is created, in which a first DataNode selected by the CNode forwards data chunks to the second DataNode selected by the CNode and in which the second DataNode forwards data chunks it has received to the third DataNode selected by the CNode to receive replicas of the data block of the file (and so on, if more than three DataNodes are to receive the block of the file).

According to one embodiment, the CNode does not assume that the DataNodes it has selected as recipients of the constituent data blocks of the client's file have, in fact, successfully received and stored the data blocks. Instead, according to one embodiment, once in possession of one or more data blocks of the client's file, the DataNodes 302, 304, 306 may report back to the CNode 202 that they now store a replica of the data block sent to them either by the client directly or by another DataNodes, as shown in FIG. 3. At least some (and, according to one embodiment, each) of the DataNodes may periodically issue a "heartbeat" message to the CNodes, which heartbeat message may be configured to inform the CNodes that the issuing DataNode is still active and in good health (i.e., able to service data access requests from clients). The DataNodes may, according to one embodiment, report the successful receipt and storage of one or more data blocks of the client's file as another message to the CNode. In the exemplary situation depicted in FIG. 3, DataNodes 302, 304, 306 may report to the CNode 202 that they have successfully received and stored one or more of the data blocks of the client's file to the CNode 202.

DataNodes can fail. Whether that failure is caused by an interruption in the communication channel between the DataNode and the CNode, failure of a file server or failure of the underlying physical storage (or any other failure), such failure means that data blocks may be unavailable, at least from the failed DataNode. In the example shown in FIG. 4. DataNode 306 has failed. According to one embodiment, the CNodes 202, 204, 206 may not be immediately apprised of this changed status of DataNode 306. Instead, the heartbeat message mechanism described above may be used to good advantage to keep the CNodes apprised of the near-current (as of the last heartbeat) status of each of the DataNodes. That is, according to one embodiment, failure of the CNodes to receive a heartbeat message within a predetermined time period is interpreted, by the CNodes, as a failure of the non-heartbeat sending DataNode. That predetermined time period may be set, for example, to a time period that is greater than the expected interval between heartbeat messages from any single DataNode.

In the example of FIG. 4, DataNode 306 has failed to send a heartbeat message ("HB" in FIG. 3) within the predetermined time interval since its last heartbeat and may, therefore, be considered to have failed and that its stored data blocks are, at least for the time being, inaccessible. In turn, this means that only DataNodes 302 and 304 store the data blocks of different files. According to one embodiment, the CNodes may keep a list of DataNodes that are currently active and, according to one embodiment, ready to accept new data blocks and/or service data access requests. Such a list may be termed an "active" list. Upon failure to receive an expected heartbeat message from a DataNode, such as DataNode 306 in FIG. 4, the DataNode may be considered to have failed and the CNodes may remove the failed DataNode from the active list. According to one embodiment, the active list may be that list from which the CNode, having received a request from a client to create a block, may select the (for example) three DataNodes to which the data block of the to-be-created file will be stored. As DataNode 306 has failed, DataNode 306 may be removed from the active list, making that DataNode, for all purposes, effectively non-existent and unavailable, at least from the point of view of the CNodes.

As the data blocks of the client's file are under-replicated (e.g., stored at fewer than the predetermined number of DataNodes) due to the failure of DataNode 306, the CNode 202 may, according to one embodiment, now select a new DataNode to which the data blocks of the client's file may be replicated, to ensure that a full complement of three DataNodes store replicas of the constituent data blocks of the file. According to one embodiment, CNode 202 may consult the active list and select, from the list, a new DataNode to which the data blocks of the client's file will be replicated, to bring the complement of DataNodes storing replicas of the data blocks of the client's file back up to three (or four, five, etc., depending upon the replication factor assigned to the file). In the example shown in FIG. 4, CNode 202 has selected DataNode 402 as that DataNode to which replicas of the data block will also be stored, to cure the under-replication of the data block. According to one embodiment, CNode 202 may also select the DataNode 304 that will send the replica in its possession to the selected DataNode 402. As shown at 406 in FIG. 4, selected DataNode 304 may then begin to stream chunks of data of the block replica or otherwise send the block replica to the newly-selected DataNode 402. As newly-selected DataNode 402 receives the block replica and as it comes time for DataNode 406 to report to the CNodes, it may report that it now stores replicas of the newly-received blocks. The CNodes may change the namespace to reflect this change. According to one embodiment, the receiving DataNode may be selected by the CNode 202 at random. According to other embodiments, such selection may be made according to predetermined selection criteria.

Figure 5:
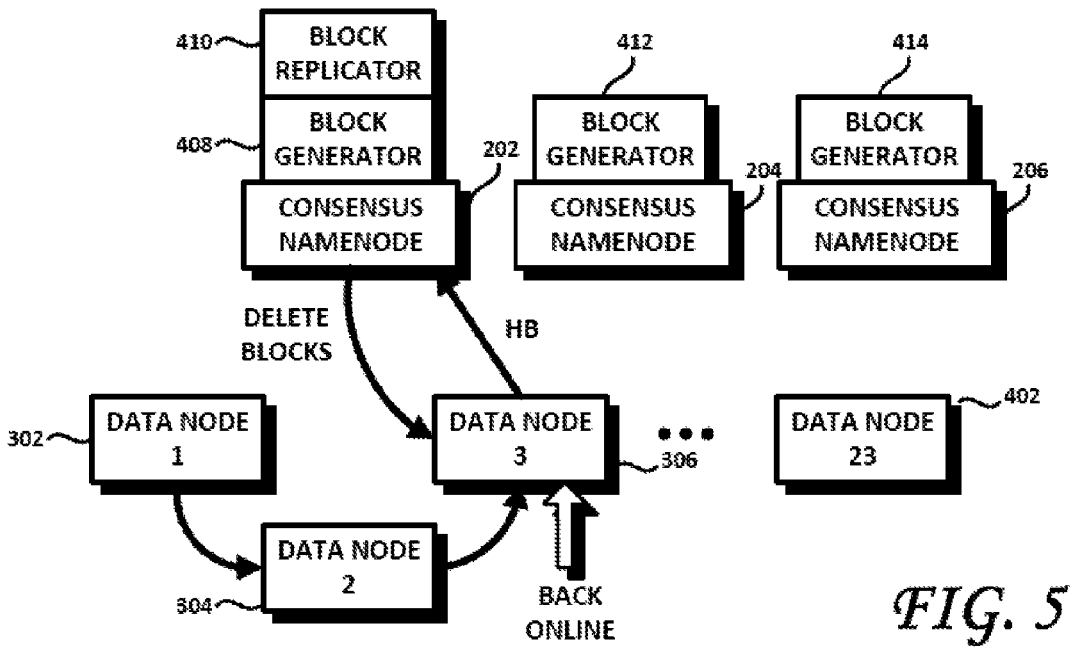
FIG. 5 is a diagram illustrating still further aspects of block replication, according to one embodiment.

According to one embodiment, each of the CNodes 202, 204, 206 is "aware" of each of the DataNodes 302, 304, 306, 402 and all other (potentially thousands) DataNodes whose heartbeats they periodically receive. Upon failure of a DataNode, more than one CNode could decide to select a DataNode as a sending DataNode and another DataNode as the recipient of block replicas, to ensure that blocks are not under-replicated. This could result in multiple CNodes selecting multiple replacement DataNodes to store the data blocks previously stored by a failed DataNode. In turn, such parallel actions may result in blocks being over-replicated (e.g., replicated more than the intended 3, 4, 5 . . . instances thereof). Such over-replication may also occur when, as shown in FIG. 5, a previously failed or otherwise inaccessible DataNode comes back online. In FIG. 5, it is assumed that previously failed or inaccessible DataNode 306 is now once again operational and accessible to the CNodes 202, 204, 206. In this state, blocks of the client's file are now present in four DataNodes: namely, original nodes 302, 304, newly-added DataNode 402 and the no-operational and accessible DataNode 306. The data blocks of the client's file are, therefore, over-replicated. As the back-online status of DataNode 3 is now known to all CNodes 202, 204, 206 (because they each received a heartbeat from revived DataNode 306), it is conceivable that more than one CNode 202, 204, 206 may independently select a DataNode from which to delete block replicas of the client's file. This independent selection may cause the block replicas of the client's file to go from an over-replicated state to an under-replicated state or in the worst case even to be deleted from all DataNodes.

To prevent such occurrences, according to one embodiment, block replication duties may be reserved for a single selected or elected CNode at any given time, the Block Replicator CNode. Such block replication duties, according to one embodiment, may comprise of coordinating block replication (i.e., instructing blocks to be copied between DataNodes) and block deletions. The functionality of block generation, according to one embodiment, does not pose such inherent risks of data loss or over-replication and may, therefore, be vested in each CNode of the cluster. Therefore, all CNodes may be configured to carry out block management duties, according to one embodiment. However, such block management duties may be divided into block replication and deletion duties that are, according to one embodiment, reserved for a single selected CNode, and block generation duties, which may be vested in each of the CNodes of a cluster. This is shown in FIG. 5, in which CNode 202 has been selected as the only CNode configured with a Block Replicator function 410, to enable only CNode 202 to cause data blocks to be copied and/or deleted from DataNodes. In contrast, and as shown in FIG. 5, each of the CNodes 202, 204, 206 may be configured to carry out Block Generator functions 408, 412 and 414, respectively, enabling any of the CNodes 202, 204 and 206 to generate blocks or enable new data blocks to be stored on selected DataNodes reporting thereto.

Each DataNode, according to one embodiment, may be configured to send all communications to all CNodes in the cluster. That is, each active, working DataNode may be configured to send heartbeats, block reports and messages about received or deleted replicas, etc. independently to each CNode of the cluster.

In current implementation of HDFS, DataNodes only recognize a single Active NameNode. In turn, this means that DataNodes will ignore any DataNode command coming from a non-active NameNode. Conventionally, if a non-active NameNode claims it is now the active NameNode, and confirms such status with a higher txId, the DataNode will perform a failover procedure, switching to a new active NameNode and only accepting DataNode commands from the new active NameNode.

To accommodate this method of operation in CNode clusters according to embodiments, only the CNode having block replicator duties (i.e., the current Block Replicator) reports its state as being active to the DataNodes. This guarantees that only the Block Replicator has the ability to command the DataNodes to replicate or delete block replicas.

Applications access HDFS via HDFS clients. Conventionally, an HDFS client would contact the single active NameNode for file metadata and then access data directly from the DataNodes. Indeed, in the current implementation of HDFS, the client always talks to the single active NameNode. If High Availability (HA) is enabled, the active NameNode can failover to a StandByNode. When that occurs, the HDFS client communicates with the newly active NameNode (previously, the StandbyNode) until and if another failover occurs. The failover is handled by a pluggable interface (e.g., FailoverProxyProvider), which can have different implementations.

According to embodiments, however, CNodes are all active at all times and can be equally used to serve namespace information to the clients. According to one embodiment, HDFS clients may be configured to communicate with CNodes via a proxy interface called, for example, the CNodeProxy. According to one embodiment, the CNodeProxy may be configured to randomly select a CNode and to open a communication socket to send the client's RPC requests to this randomly-selected CNode. The client then only sends RPC requests to this CNode until a communication timeout or a failure occurs. The communication timeout may be configurable. When the communication timeout expires, the client may switch to another (e.g., randomly-selected by the CNodeProxy) CNode, open a communication socket to this new CNode and send the client's RPC requests only to this new randomly-selected CNode. For load balancing purposes, for example, this communication timeout may be set to a low value. Indeed, if the CNode to which the client sends its RPC requests is busy, the delay in responding may be greater than the low value of the communication timeout, thereby triggering the client to switch, via the CNodeProxy, the CNode with which it will communicate.

Indeed, random selection of a CNode by HDFS clients enables load balancing of multiple clients communicating with replicated CNodes. Once the CNodeProxy has randomly selected the CNode with which the client will communicate, that client may "stick" to that CNode until, according to one embodiment, the randomly-selected CNode times out or fails. This "stickiness" to the same CNode reduces the chance of stale reads, discussed above, to the case of failover only. The CNodeProxy proxy may be configured to not select CNodes that are in SafeMode, such as may occur when the CNode is restarting and is not fully ready for service yet (e.g., is learning the agreements it may have missed during its down time).

The stale read problem, discussed above, may be further illustrated through an example. For example, if a client creates a directory via CNode1 and then the same or another client tries to list the just-created directory via CNode2, CNode2 may be behind in its learning process and may return file not found exception because it has not yet received or processed the agreement to create the directory. Similarly, a client may read different number of bytes of the last block of a file that is under construction because replicas of the same block on different DataNodes can have different lengths while the data is in transition.

The stale read problem may manifest itself in two cases:

1. A same client switches over (due to failure, intentional interruption or for load balancing purposes, for example) to a new CNode, which has an older namespace state, and
2. One client modifies namespace, which needs to be seen by other clients.

The first case may be avoided, according to one embodiment, by making the proxy interface CNodeProxy aware of the GSN of the CNode to which it is connected. With each operation. HDFS client learns about the GSN on the CNode. When the client switches to another CNode (e.g., because of failure of the CNode, timeout or a deliberate shut down of that CNode for any reason, the client, through the CNodeProxy, should either choose a CNode with the GSN, which is not lower than it had already seen, or wait until the new CNode catches up with the last GSN the client received from the previous CNode.

The second case arises when a MapReduce job starts. In this case, a MapReduce client places the job configuration files such as job.xml into HDFS, which is then read by all tasks executed on the cluster. If some task connects to a CNode that has not learned about the job configuration files, the task will fail. Conventionally, such constraint requires external coordination between the clients. However, coordination between clients is replaced, according to one embodiment, by coordinated reads.

According to one embodiment, a coordinated read may be performed in the same manner as are modification operations. That is, a CNode submits a proposal to read the file, and actually reads it when the corresponding agreement is received back from the Coordination Engine 208. Thus, read agreements, according to one embodiment, may be executed in the same global sequence as namespace modification agreements, thereby guaranteeing that coordinated reads will never be stale. According to one embodiment, coordinated reads need not be used for all reads, as doing so may unnecessarily increase the computational load on the Coordination Engine 208 and may slow down read performance of the cluster. Accordingly, according to one embodiment, only selected files, such as job.xml, may be exposed to coordinated reads. Therefore, according to one embodiment, a set of file name patterns may be defined, for example, as a configuration parameter. Such patterns may be recognized by the CNodes of a cluster. When such file name patterns are defined, the CNode matches file names to be read against the file name patterns, and if the matching is positive, the CNode performs a coordinated read for that file.

If an object has been accessed once by one client on a particular CNode, it need not be accessed through coordinated reads for subsequent clients. According to one embodiment, a file may be identified as having been accessed through specific RPC calls. In this manner, if a CNode executing such a call sees that the file has not been so identified, that CNode may submit a proposal to the Coordination Engine 208 and wait for the corresponding agreement to be received to perform a coordinated read. This read agreement reaches all CNodes, which may identify their file replicas as having been so accessed. All subsequent client calls to access the identified file, according to one embodiment, not need to be read coordinated. Hence, in the worst case with three CNodes in the cluster, there can be no more than three coordinated reads per file, thereby keeping read performance high.

CNodes can also fail or be brought down intentionally for maintenance. If a failed CNode is also the sole CNode having been invested with block replicator duties (that is, it has been elected as the Block Replicator), then the cluster may be left without the ability to replicate or delete data blocks. According to one embodiment, therefore, the CNode having the Block Replicator function as shown at 410 may be configured to also send periodic block replicator heartbeats (BR HB), as shown at 416, to the Coordination Engine 208. As long as the Coordination Engine 208 receives periodic BR HBs 416 from the CNode selected as include Block Replicator duties 410, that CNode may continue to carry out such block replication duties. However, upon failure of the Coordination Engine 208 to timely receive one or more BR HBs from the CNode selected as the Block Replicator 410, the block replication duties will be assigned to another one of the CNodes within the cluster. In turn, the CNode so selected may then issue periodic BR HBs (that are distinguished from the heartbeats HB issued by the DataNodes) to the Coordination Engine 208 and may continue in that role until the Coordination Engine 208 fails to receive one or more BR HBs, whereupon the CNode selection process may repeat.

According to one embodiment, in order to guarantee the uniqueness of the Block Replicator 410 in the cluster, the CNode comprising the Block Replicator 410 may be configured to periodically submit a BlockReplicatorProposal to the Coordination Engine 208. In turn, the Coordination Engine 208, upon receipt of the BlockReplicatorProposal, may confirm that CNode as having been selected or elected to carry out block replication duties, which confirms its block replicator mission to all CNodes in the cluster. If a BR HB is not heard by CNodes for a configurable period of time, other CNodes, by means of Coordination Engine 208, may begin a process of electing a new Block Replicator CNode.

Indeed, according to one embodiment, a BlockReplicatorProposal is a way for the CNode having block replication duties to confirm its mission as Block Replicator to other CNodes via periodic BR HBs and as a way to conduct an election of a new Block Replicator when BR HB expires. According to one embodiment, a BlockReplicatorProposal may comprise a:

brId—the id of the CNode deemed to be the Block Replicator brAge—the GSN of the proposing CNode Each CNode may store the latest BlockReplicatorAgreement it has received and the time that agreement was received: <lastBRA, lastRecieved>.

For example, suppose there are three CNodes cn1, cn2, cn3, and cn1 is the current Block Replicator CNode. CNode cn1 periodically proposes BlockReplicatorProposal as a BR HB. This proposal consists of its own node id cn1 and the new age of the Block Replicator, which is equal to the latest GSN observed by cn1 at the time of the proposal. The Coordination Engine 208 receives the BlockReplicatorProposal, generates a corresponding agreement and delivers the agreement to all CNodes cn1, cn2 and cn3. Node cn1, being current Block Replicator, learns the agreement and starts the block replication work. CNodes cn2 and cn3 are not current Block Replicators, as they only remember <lastBRA, lastReceived> and continue regular (non-replication) operations. When lastReceived exceeds a configured threshold, cn2 and/or cn3 may start the election of the new Block Replicator by, according to one embodiment, proposing itself as the candidate.

According to one embodiment, the election process may be initiated by any CNode (or by several of them simultaneously) once the CNode detects that the block replicator heartbeat BR HB has expired. The initiating CNode may, according to one embodiment, start the election process by proposing itself as a new block replicator. The proposal may include the node Id and the latest GSN that the initiating CNode had seen by that time. The proposal may be submitted to the Coordination Engine 208 and when the corresponding agreement reaches the other CNodes, they update their mission with respect to block replicator duty accordingly. That is how the CNode that initiated the election process may become the new block replicator. According to one embodiment, in the case in which several CNodes initiate the election simultaneously, the CNode that proposed the agreement with the highest GSN becomes the block replicator. Thus, the CNode having block replicator duties may change several times during the election process, but in the end there will be only one Block Replicator CNode and all CNodes will agree that CNode has the block replicator duties. According to one embodiment, a failed CNode is guaranteed to never make any block replication or deletion decisions even if it comes back online after failure still assuming it is the Block Replicator. This is because the decision to replicate or to delete blocks is made only as the result of processing a BR HB. That is, after coming back to service, the CNode will wait for the next block replicator heartbeat BR HB to make a replication decision, but the heartbeat agreement will contain information about the new Block Replicator assignment, upon receipt of which the newly-active CNode will know that it no longer has block replication duties.

Figure 6:
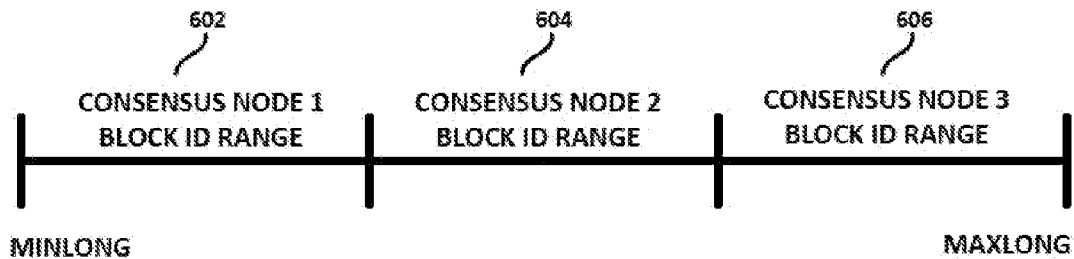
FIG. 6 is a diagram illustrating one manner in which block identifiers may be made to be unique across Consensus NameNodes, according to one embodiment.

That any CNode is enabled to generate or enable the generation of blocks requires that each data block stored in the DataNodes be uniquely identifiable, across the entire cluster. Randomly generating long data block identifiers (IDs) and then checking whether such generated data block ID is truly unique is the current method of generating block IDs in HDFS. This approach is problematic for replicated CNodes since the new block ID must be generated before the proposal to create the block submitted to the Coordination Engine, but by the time the corresponding agreement reaches CNodes, the ID could have already been assigned to another block even though that ID was free at the time it was generated. Coordinating such collisions at the agreement time, although possible, adds unnecessary complexity, traffic and lag time to the process, and delays the eventual acknowledgement of successful data block generation to the client. Instead, according to one embodiment and as shown in FIG. 6, a large range may be defined, ranging from a minimum block ID number (MINLONG) to a maximum block ID number (MAXLONG). This large range may be as large as required to ensure that each data block ID number is unique across the entire cluster and, according to one embodiment, past the anticipated lifetime thereof. For example, the range from MINLONG to MAXLONG may be, for example, a number comprising 1024 bits or more. Thereafter, to ensure that each CNode generates unique data block ID numbers, the MINLONG to MAXLONG range may be logically divided into three CNode block ID ranges, shown in FIG. 6 at ranges 602, 604 and 606. For example, data block ID range 602 may span from MINLONG to MINLONG+X bits, block ID range 604 may span from MINLONG+X to MINLONG+2X, and block ID range 606 may span from MINLONG+2X to MAXLONG.

Figure 7:
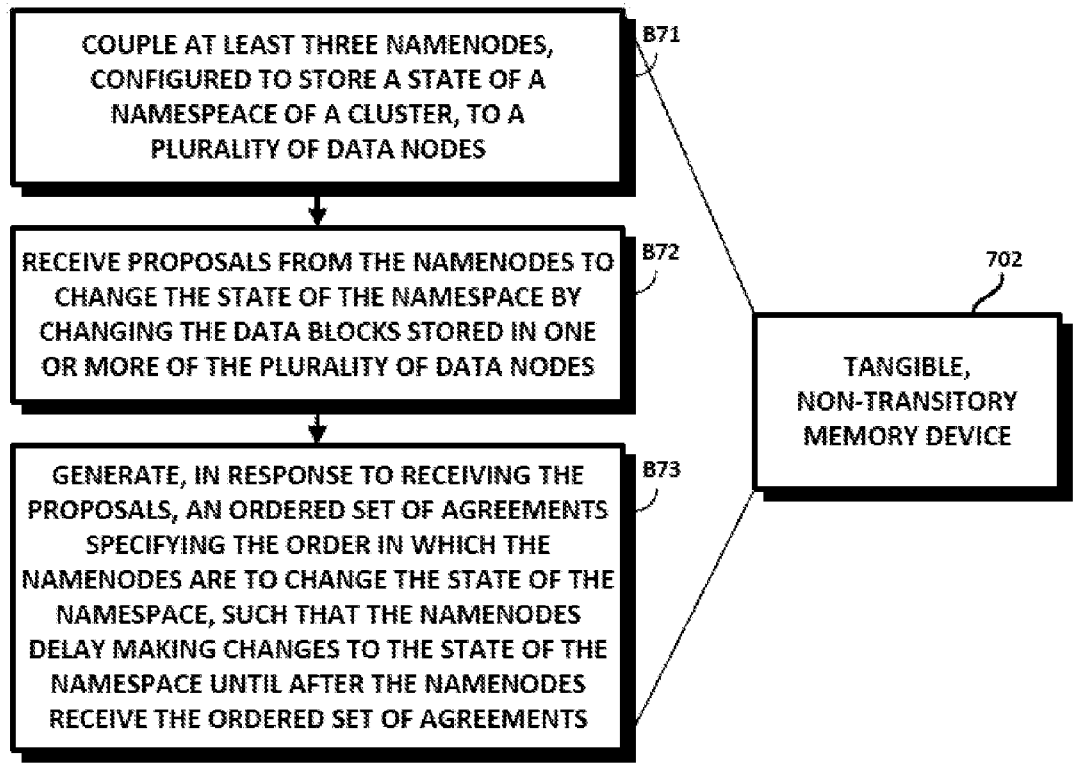
FIG. 7 is a flowchart of a computer-implemented method of implementing a distributed file system comprising a plurality of DataNodes configured to store data blocks of client files, according to one embodiment.

FIG. 7 is a flowchart of a computer-implemented method of implementing a distributed file system comprising a plurality of DataNodes configured to store data blocks of files, according to one embodiment. As shown in Block B71, the method may comprise a step of coupling at least three namenodes (or some other larger odd number) to a plurality of DataNodes. Each of the namenodes may be, according to one embodiment, configured to store a state of the namespace of the cluster. As shown in Block B72, a step may then be carried out of (the Coordination Engine 208, for example) receiving proposals from the namenodes (such as shown at 202, 204, 206 in FIG. 2) to change the state of the namespace by creating or deleting files and directories and adding the data blocks stored in one or more of the plurality of DataNodes (such as shown at 302, 304 and 306 in FIG. 3). Within the present disclosure, "changing", where appropriate, encompasses adding new data blocks, replicating data blocks or deleting data blocks of a client's file. As shown at B73, the computer-implemented method may further comprise generating, in response to receiving the proposals, an ordered set of agreements that specifies the sequence in which the namenodes are to change the state of the namespace. According to one embodiment, therefore, the namenodes delay making changes (requested by clients, for example) to the state of the namespace until the namenodes receive the ordered set of agreements (from the Coordination Engine 208, for example).

According to one embodiment, when a new CNode is to be brought online (such as may be the case in which an existing CNode has failed or is otherwise shut down), the new CNode may be started up in SafeMode, as noted above. The new CNode in SafeMode may then begin receiving registrations and initial data block reports from DataNodes, identifying the data blocks stored in each of the DataNodes to which the new CNode is coupled. According to one embodiment, when a CNode is in SafeMode, it does not accept requests from clients to modify the state of the namespace. That is, before submitting a proposal, the new CNode checks if it is in SafeMode and throws SafeModeException if the new CNode determines that is currently operating in SafeMode. When a sufficient number of block reports are received, according to one embodiment, the new CNode may leave SafeMode and start accepting data modification requests from the clients. On startup, according to one embodiment, CNodes automatically enter SafeMode and then also automatically and asynchronously leave SafeMode once they have received a sufficient number of reports of blocks replicas. The exit from automatic SafeMode, according to one embodiment, is not coordinated through Coordination Engine 208, because CNodes (such as CNodes 202, 204 and 206 in FIG. 2) may process block reports at different rates and, therefore, may reach the threshold at which they may exit SafeMode at different times. In contrast, when a cluster administrator issues a command to enter SafeMode, all CNodes should obey. For this reason, administrator-issued SafeMode commands may be, according to one embodiment, coordinated through the Coordination Engine 208.

As noted above, CNodes can fail or brought down intentionally for maintenance. According to one embodiment, the remaining replicated CNodes will continue operating as long as they form a quorum sufficient for the Coordination Engine 208 to generate agreements. If quorum is lost, according to one embodiment, the cluster will freeze and cease processing requests for changes to the namespace until the quorum is restored.

When a previously-failed CNode or a CNode that was deliberately brought offline comes back online, it will automatically catch up with the other CNodes in its state. According to one embodiment, the Coordination Engine 208 may supply the CNode being brought back online with all the agreements it missed while it was offline. During this period of time, the CNode being brought back online does not have its RPC Server started. Therefore, clients and DataNodes are not able to connect to it (since the RPC is the mode by which they may communicate), which avoids the CNode being brought back up from supplying potentially stale data to the requesting clients. This process happens before the DataNodes connect to the CNode being brought back online. DataNode registrations and initial block reports must be delayed as the reports may contain blocks that the CNode has not learned about yet and which would have been discarded had they been reported.

If the CNode was offline for a long time and missed a significant number of agreements (which may be a configurable threshold), it may be impractical or unfeasible to wait for the CNode to receive the agreements it missed while it was offline and to replay the whole history of missed agreements. In this case and according to one embodiment, it may be more efficient to have the CNode download a checkpoint from one of the active CNodes, load it as the initial namespace state and then receive agreements from the Coordination Engine 208 starting from that checkpoint and then replay the history of the provided agreements from when the checkpoint was made. To do so, the CNode being brought back online may choose one of the active nodes (called the "helper") as a source for retrieving the checkpoint and sends an RPC call (e.g., startCheckpoint()) to the chosen helper CNode. The helper CNode then issues a StartCheckpoint proposal to the Coordination Engine 208, to ensure that all other CNodes sync up their local checkpoints to the same GSN. When the StartCheckpoint agreement arrives, the helper CNode will remember the GSN of that agreement as a specifically-identified checkpoint that is current up to a specific GSN (e.g., checkpointGSN). This checkpointGSN then determines the agreement after which the emerging CNode will start the learning process once it consumes the checkpoint.

The consumption of the checkpoint by the CNode being brought back online may be performed by uploading the image and the journal files, as is standard for HDFS. After catching up, the CNode may then start receiving block reports from DataNodes. Once SafeMode is off, the newly back online CNode may fully join the cluster and resume its normal duties.

According to one embodiment, the startup of a new CNode or a restart of an existing CNode may comprise the following main stages.
1. The CNode being brought back online starts up and joins the cluster as a Proposer, but with the Learner capabilities muted until stage 3.
    a. It examines its state in the global history relative to other nodes.
2. If its state is substantially behind other nodes—determined by a configurable threshold, then it will download a more recent checkpoint from a selected one of the active helper nodes. The selected helper node also provides the checkpointGSN, which corresponds to the state in history as of the creation of the checkpoint.
3. When the checkpoint is downloaded (if it was necessary) the CNode being brought back online submits its first proposal to the Coordination Engine 208, called AgreementsRecoveryProposal (ARP), and assumes the Learner role.
    a. The CNode being brought back online may start learning the agreements it missed when it was offline, starting from checkpointGSN+1.
4. When CNode being brought back online reaches its own first ARP agreement the catch-up process is considered complete. The newly-brought back online CNode may now assumes the Acceptor role and become a fully functional participant of the cluster and receive further agreements from and submit proposals to the Coordination Engine 208.
5. To do so, the newly brought back online CNode may initialize its RPC server and makes itself available to DataNodes for registrations and block reports. After processing the reports and leaving SafeMode, the CNode may start accepting client requests on an equal basis with the other CNodes of the cluster.

As noted above, each CNode, according to one embodiment, may store an image of the namespace and updates thereto in local persistent (non-volatile) storage that is coupled to the CNode. It is to be noted that the local storage (if present) may be configured such that it is not shared between CNodes. According to one embodiment, each CNode may maintain, in its local persistent storage, its own local image file containing a last namespace image checkpoint and local edits file, which edits file constitutes a journal of transactions applied to the namespace since the last checkpoint. According to one embodiment, shutting down a cluster may bring down CNodes at different moments of namespace evolution. That is, some CNodes may have already applied all transaction specified by the agreements received from the Coordination Engine 208, but some lagging CNodes may not yet have applied all such transactions. Therefore, after a shutdown, edits files on different CNodes may not be equivalent. Therefore, when the cluster restarts, the lagging CNode may start at an older state than is the current state. However, the Coordination Engine 208 may be configured to force the lagging CNode up to the current state by feeding to it missed events from the global sequence.

It is to be noted that this is no different from the nominal cluster operation when some CNodes may fall behind others in updating the state of the namespace through the processing of agreements received from the Coordination Engine 208. Such lagging CNodes may still accept namespace modification requests from clients, and make proposals to the Coordination Engine 208. The resulting proposals will be ordered, placed into the global sequence after the events the CNode has yet to process and will be applied to update the state of the namespace in due order. In this manner, a lagging CNode may be brought "back up to speed" (that is, up to the most current GSN), before new requests are processed, thereby maintaining consistency in the state of the namespace across CNodes of the cluster. According to one embodiment, discrepancies in the persistent state of CNodes during startup may be avoided by performing a "clean" shutdown procedure.

According to one embodiment, a clean shutdown procedure may be provided to force all CNodes to a common state before a cluster is shut down. As the result of carrying out a clean shutdown, all of the local images of the namespace stored in the persistent local memory coupled to each of the CNodes will be identical, and the updates thereto may be represented by an empty sequence of transactions. According to one embodiment, to cleanly shut down and force all local images of the namespace to be identical, each CNode may be commanded to enter the SafeMode of operation, during which time the CNode ceases to process client requests to modify the namespace, while the remaining agreements sent to it by the Coordination Engine 208 are still being processed. Thereafter, an operation may be carried out to save the namespace, thereby creating a local checkpoint of the namespace and emptying the journal. Before killing the CNode processes, it may be ensured that all CNodes have completed their save of the (now identical, across CNodes) namespace and have created their respective local checkpoint of the namespace, to thereby all CNodes to restart with the same namespace. Thereafter, the CNode processes may be killed. After a clean shutdown, any subsequent startup process will proceed faster than would otherwise be the case had the CNodes not been shut down cleanly, as none of the CNodes need apply edits and missed updates from the Coordination Engine 208 (as they all were placed in an identical state prior to shutdown).

While certain embodiments of the disclosure have been described, these embodiments have been presented by way of example only, and are not intended to limit the scope of the disclosure. Indeed, the novel computer-implemented methods, devices and systems described herein may be embodied in a variety of other forms. For example, one embodiment comprises a tangible, non-transitory machine-readable medium having data stored thereon representing sequences of instructions which, when executed by computing devices, cause the computing devices to implementing a distributed file system as described and shown herein. For example, the sequences of instructions may be downloaded and then stored on a memory device (such as shown at 702 in FIG. 7, for example), storage (fixed or rotating media) device or other data carrier, for example). The instructions may comprise, according to one embodiment, instructions for coupling at least two namenodes to a plurality of data nodes, each of the namenodes being configured to store a state of a namespace of the cluster and each being configured to respond to a request from a client while at least one other of the namenodes is responding to another request from another client; receiving proposals from the namenodes to change the state of the namespace by replicating, deleting and/or adding data blocks in/from/to at one or more of the plurality of data nodes, and generating, in response to receiving the proposals, an ordered set of agreements that specifies an order in which the namenodes are to change the state of the namespace, such that the namenodes delay making changes to the state of the namespace until the namenodes receive the ordered set of agreements. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of implementing a distributed file system comprising an entire cluster comprising a plurality of data nodes configured to store data blocks of client files, the method, comprising:

coupling at least two active namenodes to a plurality of data nodes, each active namenode of the active namenodes being configured to store a state of a same namespace of the entire cluster, the namespace including at least a location within each data node of the plurality of data nodes of each data block of the client files across the entire cluster, said each active namenode of the at least two active namenodes being configured to respond to any request from any client of the distributed file system to generate a new data block or enable a new data block to be stored on any of the data nodes while at least one other of the active namenodes is responding to any other request from the same or any other client to generate another new data block or enable another new data block to be stored on any of the data nodes, only one of the active namenodes being configured to respond to requests from any client to replicate or delete data blocks from the data nodes;

receiving, by using a computer system, proposals from the active namenodes to change the state of the namespace, and generating, in response to receiving the proposals, an ordered set of agreements that specifies an order in which the active namenodes are to change the state of the namespace and assigning a unique global sequence number (GSN) to each agreement of the ordered set of agreements, the GSN specifying an order in which the active namenodes are to apply changes to the state of the namespace, such that the active namenodes delay making the changes to the state of the namespace until the active namenodes receive the ordered set of agreements and apply the changes to the state of the namespace in the order specified by the GSN of each received agreement of the received agreements.

2. The computer-implemented method of claim 1, further comprising storing an image of the namespace and entries specifying updates to the namespace in local storage coupled to each active namenode of the plurality of active namenodes.

3. The computer-implemented method of claim 1 further comprising configuring the active namenode configured to enable replication and deletion of data blocks to periodically issue a block replicator heartbeat message.

4. The computer-implemented method of claim 3, further comprising triggering an election process to elect a new active namenode that is to be solely configured to enable replication and deletion of data blocks upon failure of the active namenode configured to enable replication and deletion of data blocks to periodically issue the block replicator heartbeat.

5. The method of claim 4 wherein the election process is configured to be initiated by any of the active namenodes.

6. The computer-implemented method of claim 1, further comprising configuring each active namenode of the active namenodes to enable data blocks stored on one of the plurality of data nodes to be replicated to a predetermined other one or other ones of the plurality of data nodes.

7. The computer-implemented method of claim 6, further comprising configuring at least one of the data nodes, upon receipt of data blocks, to send the data blocks to another of the plurality of data nodes identified by one of the active namenodes.

8. The computer-implemented method of claim 1, further comprising configuring each data node of the plurality of data nodes to periodically issue a heartbeat message to the active namenodes, indicating a current status of the data node.

9. The computer-implemented method of claim 8, further comprising configuring the active namenodes to consider a data node from which the heartbeat message has not been timely received to have failed.

10. The computer-implemented method of claim 1, further comprising configuring only one of the active namenodes to enable data blocks stored in a failed data node to be replicated to another selected one of the plurality of data nodes.

11. The computer-implemented method of claim 1, further comprising configuring each active namenode of the active namenodes to assign a unique block identifier (ID) to data blocks from within a sub-range of a larger range of block ID numbers that is separate from other respective sub-ranges of the larger range of block IDs from which other ones of the active namenodes assign block ID numbers.

12. The computer-implemented method of claim 1, further comprising setting a communication timeout configured such that, if an active namenode having received a client request has not responded thereto at an expiry of the communication timeout, the client request is made to another of the active namenodes.

13. The computer-implemented method of claim 1, further comprising enabling all of the active namenodes in the cluster to actively support client requests simultaneously.

14. The computer-implemented method of claim 1 wherein, upon failure of one of the active namenodes, making client requests previously made to the failed namenode to another one of the active namenodes.

15. The computer-implemented method of claim 14 wherein, prior to making client requests to the other active namenode, waiting until the other active namenode updates its namespace.

16. The computer-implemented method of claim 1, further comprising each active namenode of the active namenodes, to prevent stale reads, submitting a coordinated read proposal to a coordination engine when a request is received to read a file that is determined to satisfy selected file name patterns and enabling the file to be read only upon receiving an agreement corresponding to the coordinated read proposal.

17. The computer-implemented method of claim 1, further comprising enabling a new active namenode to be brought into the cluster, wherein the new name node is configured to update the state of its namespace by at least one of:
loading a checkpoint comprising a prior image of the namespace, and
accepting agreements to its namespace from a coordination engine.

18. The computer-implemented method of claim 1, wherein the received proposals are configured to change the namespace by at least one of replicating, deleting and adding data blocks in at least one of the plurality of data nodes.

19. A non-transitory machine-readable medium having data stored thereon representing sequences of instructions which, when executed by computing devices, cause the computing devices to implement a distributed file system by:
coupling at least two active namenodes to a plurality of data nodes, each active namenode of the active namenodes being configured to store a state of a same namespace of an entire cluster, the namespace including at least a location within each data node of the plurality of data nodes of each data block of client files across the entire cluster, said each active namenode of the at least two active namenodes being configured to respond to any request from any client of the distributed file system to generate a new data block or enable a new data block to be stored on any of the data nodes while at least one other of the active namenodes is responding to any other request from the same or any other client to generate another new data block or enable another new data block to be stored on any of the data nodes, only one of the active namenodes being configured to respond to requests from any client to replicate or delete data blocks from the data nodes;
receiving proposals from the active namenodes to change the state of the namespace, and
generating, in response to receiving the proposals, an ordered set of agreements that specifies an order in which the active namenodes are to change the state of the namespace and assigning a unique global sequence number (GSN) to each agreement of the ordered set of agreements, the GSN specifying an order in which the active namenodes are to apply changes to the state of the namespace, such that the active namenodes delay making the changes to the state of the namespace until the active namenodes receive the ordered set of agreements and apply the changes to the state of the namespace in the order specified by the GSN of each received agreement of the received agreements.

20. The non-transitory machine-readable medium of claim 19, wherein the received proposals are configured to change the namespace by at least one of replicating, deleting and adding data blocks in at least one of the plurality of data nodes.

* * * * *